(12) United States Patent
Williams et al.

(10) Patent No.: US 9,262,741 B1
(45) Date of Patent: Feb. 16, 2016

(54) CONTINUOUS BARCODE TAPE BASED INVENTORY LOCATION TRACKING

(71) Applicants: Jeff Williams, El Cerrito, CA (US); Ravi Bhaskaran, San Francisco, CA (US); Charlie Martin, Walnut Creek, CA (US)

(72) Inventors: Jeff Williams, El Cerrito, CA (US); Ravi Bhaskaran, San Francisco, CA (US); Charlie Martin, Walnut Creek, CA (US)

(73) Assignee: CODESHELF, Oakland, CA (US)

( * ) Notice: Subject to any disclaimer, the term of this patent is extended or adjusted under 35 U.S.C. 154(b) by 0 days.

(21) Appl. No.: 14/697,651

(22) Filed: Apr. 28, 2015

(51) Int. Cl.
*G06F 19/00* (2011.01)
*G06Q 10/08* (2012.01)

(52) U.S. Cl.
CPC .................................. *G06Q 10/087* (2013.01)

(58) Field of Classification Search
CPC ... G06Q 10/087; G06Q 20/203; G06Q 30/02; G06Q 10/08355; G06Q 10/0875; G06Q 30/00; G06Q 30/018; G06Q 30/06; B65C 11/0289; B65C 11/006; B65C 2009/0084; B65C 9/1803
USPC ........................................ 235/385, 375, 386
See application file for complete search history.

(56) References Cited

U.S. PATENT DOCUMENTS

| 3,690,479 | A | * | 9/1972 | Castaldi | 414/274 |
|---|---|---|---|---|---|
| 4,093,086 | A | | 6/1978 | Lucas et al. | |
| 4,563,739 | A | | 1/1986 | Gerpheide et al. | |
| 4,716,530 | A | | 12/1987 | Ogawa et al. | |
| 4,737,910 | A | * | 4/1988 | Kimbrow | |
| 4,957,379 | A | * | 9/1990 | Hamisch et al. | 400/120.16 |
| 4,974,166 | A | | 11/1990 | Maney et al. | |
| 5,050,153 | A | | 9/1991 | Lee | |
| 5,117,096 | A | | 5/1992 | Bauer et al. | |
| 5,166,884 | A | | 11/1992 | Maney et al. | |
| 5,228,820 | A | | 7/1993 | Stansfield et al. | |
| 5,311,335 | A | | 5/1994 | Crabtree | |
| 5,328,260 | A | | 7/1994 | Beirise | |
| 5,362,197 | A | | 11/1994 | Rigling | |
| 5,394,766 | A | | 3/1995 | Johnson et al. | |

(Continued)

FOREIGN PATENT DOCUMENTS

| CA | 2577346 A1 | 4/2006 |
|---|---|---|
| CA | 2652114 A1 | 12/2007 |

(Continued)

OTHER PUBLICATIONS

Peter Whitney et al. "A Low-Friction Passive Fluid Transmission and Fluid-Tendon Soft Actuator", IEEE/RSJ International Conference on Intelligent Robots and Systems (IROS) 2014, Sep. 14, 2014 (pp. 8) http://www.disneyresearch.com/wp-content/uploads/Project_FluidSoftActuator_IROS14_paper.pdf.

(Continued)

*Primary Examiner* — Thien M Le
(74) *Attorney, Agent, or Firm* — Raj Abhyanker, P.C.

(57) ABSTRACT

Disclosed are a method, system and/or device of continuous barcode tape based inventory location tracking. In one aspect, a method includes analyzing a layout diagram of a distribution center. The method further includes determining that the layout diagram includes a shelf. A number of segments associated with the shelf based on a forecasted allocation of an inventory on the shelf are calculated. A bar code tape having a globally unique identifier (GUID) associated with each segment of the number of shelves is automatically generated using a processor and a memory of a central inventory tracking system.

17 Claims, 8 Drawing Sheets

(56) References Cited

U.S. PATENT DOCUMENTS

| | | |
|---|---|---|
| 5,434,775 A | 7/1995 | Sims et al. |
| 5,625,559 A | 4/1997 | Egawa |
| 5,646,389 A | 7/1997 | Bravman et al. |
| 5,664,113 A | 9/1997 | Worger et al. |
| 5,720,157 A | 2/1998 | Ross |
| 5,963,134 A | 10/1999 | Bowers et al. |
| 6,164,537 A | 12/2000 | Mariani et al. |
| 6,208,908 B1 | 3/2001 | Boyd et al. |
| 6,289,260 B1 | 9/2001 | Bradley et al. |
| 6,307,952 B1 | 10/2001 | Dietz |
| 6,339,764 B1 | 1/2002 | Livesay et al. |
| 6,341,271 B1 | 1/2002 | Salvo et al. |
| 6,567,788 B1 | 5/2003 | Johnson, Jr. |
| 6,602,037 B2 | 8/2003 | Winkler |
| 6,622,127 B1 | 9/2003 | Klots et al. |
| 6,681,990 B2 | 1/2004 | Vogler et al. |
| 6,748,292 B2 | 6/2004 | Mountz |
| 6,845,912 B2 | 1/2005 | Scannell |
| 6,895,301 B2 | 5/2005 | Mountz |
| 6,950,722 B2 | 9/2005 | Mountz |
| 7,009,501 B2 | 3/2006 | Olch |
| 7,238,079 B2 | 7/2007 | Madhani et al. |
| 7,267,271 B2 | 9/2007 | Rhea |
| 7,342,494 B2 | 3/2008 | Maloney |
| 7,402,018 B2 | 7/2008 | Mountz et al. |
| 7,418,405 B1 | 8/2008 | Utter et al. |
| 7,504,949 B1 | 3/2009 | Rouaix et al. |
| 7,516,848 B1 | 4/2009 | Shakes et al. |
| 7,591,630 B2 | 9/2009 | Lert, Jr. |
| 7,628,093 B2 | 12/2009 | Madhani et al. |
| 7,650,298 B2 | 1/2010 | Godlewski |
| 7,698,176 B2 | 4/2010 | Taylor et al. |
| 7,706,920 B2 | 4/2010 | Wieland |
| 7,718,105 B2 | 5/2010 | Tye et al. |
| 7,740,953 B2 | 6/2010 | Jackson et al. |
| 7,751,928 B1 | 7/2010 | Antony et al. |
| 7,774,243 B1 | 8/2010 | Antony et al. |
| 7,819,719 B2 | 10/2010 | Tye et al. |
| 7,826,919 B2 | 11/2010 | D'Andrea et al. |
| 7,850,413 B2 | 12/2010 | Fontana |
| 7,873,469 B2 | 1/2011 | D'Andrea et al. |
| 7,887,729 B2 | 2/2011 | Tye et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 7,920,962 B2 | 4/2011 | D'Andrea et al. |
| 7,984,500 B1 | 7/2011 | Khanna et al. |
| 8,006,903 B2 | 8/2011 | Braun et al. |
| 8,032,417 B2 | 10/2011 | Marella et al. |
| 8,042,171 B1 | 10/2011 | Nordstrom et al. |
| 8,052,185 B2 | 11/2011 | Madhani |
| 8,060,255 B2 | 11/2011 | Wieland |
| 8,068,978 B2 | 11/2011 | D'Andrea et al. |
| 8,170,711 B2 | 5/2012 | D'Andrea et al. |
| 8,209,748 B1 | 6/2012 | Nordstrom et al. |
| 8,220,710 B2 | 7/2012 | Hoffman et al. |
| 8,239,291 B2 | 8/2012 | Hoffman et al. |
| 8,244,469 B2 | 8/2012 | Cheung et al. |
| 8,244,603 B1 | 8/2012 | Tang et al. |
| 8,249,245 B2 | 8/2012 | Jay et al. |
| 8,265,873 B2 | 9/2012 | D'Andrea et al. |
| 8,269,447 B2 | 9/2012 | Smoot et al. |
| 8,280,546 B2 | 10/2012 | D'Andrea et al. |
| 8,280,547 B2 | 10/2012 | D'Andrea et al. |
| 8,301,294 B1 | 10/2012 | Shakes et al. |
| 8,306,650 B1 | 11/2012 | Antony et al. |
| 8,307,073 B1 | 11/2012 | Brundage et al. |
| 8,307,099 B1 | 11/2012 | Khanna et al. |
| 8,310,923 B1 | 11/2012 | Nordstrom et al. |
| 8,311,902 B2 | 11/2012 | Mountz et al. |
| 8,335,585 B2 | 12/2012 | Hansl et al. |
| 8,336,420 B2 | 12/2012 | Carter et al. |
| 8,351,689 B2 | 1/2013 | Turner et al. |
| 8,374,724 B2 | 2/2013 | Wieland et al. |
| 8,412,400 B2 | 4/2013 | D'Andrea et al. |
| 8,425,173 B2 | 4/2013 | Lert et al. |
| 8,429,806 B2 | 4/2013 | Tye et al. |
| 8,433,437 B1 | 4/2013 | Shakes et al. |
| 8,438,149 B1 | 5/2013 | Dicker et al. |
| 8,444,369 B2 | 5/2013 | Watt et al. |
| 8,458,227 B1 | 6/2013 | Brundage et al. |
| 8,473,374 B2 | 6/2013 | Allison et al. |
| 8,483,869 B2 | 7/2013 | Wurman et al. |
| 8,502,862 B2 | 8/2013 | Turner et al. |
| 8,538,692 B2 | 9/2013 | Wurman et al. |
| 8,542,816 B2 | 9/2013 | Kaufman et al. |
| 8,548,613 B2 | 10/2013 | Presetenback et al. |
| 8,565,909 B2 | 10/2013 | Bickel et al. |
| 8,568,642 B2 | 10/2013 | Jackson et al. |
| 8,576,235 B1 | 11/2013 | Sumner et al. |
| 8,594,834 B1 | 11/2013 | Clark et al. |
| 8,600,035 B2 | 12/2013 | Jay et al. |
| 8,606,392 B2 | 12/2013 | Wurman et al. |
| 8,612,641 B1 | 12/2013 | Bozarth et al. |
| 8,626,335 B2 | 1/2014 | Wurman et al. |
| 8,626,935 B2 | 1/2014 | Khanna et al. |
| 8,639,382 B1 | 1/2014 | Clark et al. |
| 8,649,899 B2 | 2/2014 | Wurman et al. |
| 8,651,916 B2 | 2/2014 | Irmler et al. |
| 8,655,730 B1 | 2/2014 | Swan et al. |
| 8,688,598 B1 | 4/2014 | Shakes et al. |
| 8,700,499 B2 | 4/2014 | Laughlin et al. |
| 8,700,502 B2 | 4/2014 | Mountz et al. |
| 8,718,814 B1 | 5/2014 | Clark et al. |
| 8,723,872 B2 | 5/2014 | Beardsley et al. |
| 8,725,286 B2 | 5/2014 | D'Andrea et al. |
| 8,731,708 B2 | 5/2014 | Shakes et al. |
| 8,740,538 B2 | 6/2014 | Lert et al. |
| 8,744,627 B2 | 6/2014 | Wieland |
| 8,761,927 B2 | 6/2014 | Johnson et al. |
| 8,763,116 B1 | 6/2014 | Khanna et al. |
| 8,781,624 B2 | 7/2014 | Hodgins et al. |
| 8,786,680 B2 | 7/2014 | Shiratori et al. |
| 8,798,784 B1 | 8/2014 | Clark et al. |
| 8,798,786 B2 | 8/2014 | Wurman et al. |
| 8,801,488 B2 | 8/2014 | Irmler |
| 8,803,951 B2 | 8/2014 | Gay et al. |
| 8,805,573 B2 | 8/2014 | Brunner et al. |
| 8,805,574 B2 | 8/2014 | Stevens et al. |
| 8,805,584 B2 | 8/2014 | Yamane |
| 8,812,378 B2 | 8/2014 | Swafford, Jr. et al. |
| 8,821,781 B2 | 9/2014 | Martin |
| 8,823,639 B2 | 9/2014 | Jackson et al. |
| 8,831,984 B2 | 9/2014 | Hoffman et al. |
| 8,848,898 B2 | 9/2014 | Jay et al. |
| 8,858,351 B2 | 10/2014 | Crawford |
| 8,874,262 B2 | 10/2014 | Mistry |
| 8,874,444 B2 | 10/2014 | Irmler et al. |
| 8,876,571 B2 | 11/2014 | Trowbridge et al. |
| 8,879,717 B2 | 11/2014 | Jay et al. |
| 8,884,948 B2 | 11/2014 | Turner et al. |
| 8,886,710 B2 | 11/2014 | Evans et al. |
| 8,892,240 B1 | 11/2014 | Vliet et al. |
| 8,898,137 B1 | 11/2014 | Brundage et al. |
| 8,909,368 B2 | 12/2014 | D'Andrea et al. |
| 8,917,202 B2 | 12/2014 | Grosinger et al. |
| 8,918,202 B2 | 12/2014 | Kawano |
| 8,918,645 B2 | 12/2014 | Evans et al. |
| 8,927,081 B2 | 1/2015 | Tye et al. |
| 8,930,133 B2 | 1/2015 | Wurman et al. |
| 8,939,840 B2 | 1/2015 | Heatherly et al. |
| 8,947,422 B2 | 2/2015 | Turner et al. |
| 2002/0021954 A1 | 2/2002 | Winkler |
| 2003/0036985 A1 | 2/2003 | Soderholm |
| 2003/0216969 A1 | 11/2003 | Bauer et al. |
| 2003/0222141 A1 | 12/2003 | Vogler et al. |
| 2004/0010337 A1 | 1/2004 | Mountz |
| 2004/0010339 A1 | 1/2004 | Mountz |
| 2004/0034581 A1 | 2/2004 | Hill et al. |
| 2004/0093116 A1 | 5/2004 | Mountz |
| 2004/0111911 A1 | 6/2004 | Scannell |
| 2004/0188523 A1 | 9/2004 | Lunak et al. |
| 2005/0027620 A1 | 2/2005 | Taylor et al. |
| 2005/0087602 A1 | 4/2005 | Scannell |

(56) References Cited

U.S. PATENT DOCUMENTS

| | | |
|---|---|---|
| 2005/0102203 A1 | 5/2005 | Keong |
| 2005/0206586 A1* | 9/2005 | Capurso et al. .................. 345/50 |
| 2005/0234784 A1 | 10/2005 | McClellan et al. |
| 2005/0238467 A1 | 10/2005 | Minges |
| 2006/0085235 A1 | 4/2006 | Nguyen et al. |
| 2006/0210382 A1 | 9/2006 | Mountz et al. |
| 2007/0017984 A1 | 1/2007 | Mountz et al. |
| 2007/0021031 A1 | 1/2007 | Madhani et al. |
| 2007/0021863 A1 | 1/2007 | Mountz et al. |
| 2007/0021864 A1 | 1/2007 | Mountz et al. |
| 2007/0136152 A1 | 6/2007 | Dunsker et al. |
| 2007/0162360 A1 | 7/2007 | Congram et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0294029 A1 | 12/2007 | D'Andrea et al. |
| 2008/0001372 A1 | 1/2008 | Hoffman et al. |
| 2008/0051984 A1 | 2/2008 | Wurman et al. |
| 2008/0051985 A1 | 2/2008 | D'Andrea et al. |
| 2008/0166217 A1 | 7/2008 | Fontana |
| 2008/0167884 A1 | 7/2008 | Mountz et al. |
| 2008/0167933 A1 | 7/2008 | Hoffman et al. |
| 2008/0216596 A1 | 9/2008 | Madhani et al. |
| 2009/0074545 A1 | 3/2009 | Lert, Jr. et al. |
| 2009/0185884 A1 | 7/2009 | Wurman et al. |
| 2009/0202854 A1 | 8/2009 | Jackson et al. |
| 2009/0298603 A1 | 12/2009 | Crawford |
| 2009/0299521 A1 | 12/2009 | Hansl et al. |
| 2010/0174550 A1 | 7/2010 | Reverendo et al. |
| 2010/0227527 A1 | 9/2010 | Smoot et al. |
| 2010/0250001 A1 | 9/2010 | Hodgins et al. |
| 2010/0253919 A1 | 10/2010 | Douglas |
| 2010/0259057 A1 | 10/2010 | Madhani |
| 2010/0271654 A1 | 10/2010 | Prestenback et al. |
| 2011/0015779 A1 | 1/2011 | D'Andrea et al. |
| 2011/0029412 A1 | 2/2011 | Laughlin et al. |
| 2011/0060449 A1 | 3/2011 | Wurman et al. |
| 2011/0087354 A1 | 4/2011 | Tye et al. |
| 2011/0103924 A1 | 5/2011 | Watt et al. |
| 2011/0103925 A1 | 5/2011 | Welch et al. |
| 2011/0112758 A1 | 5/2011 | D'Andrea et al. |
| 2011/0125312 A1 | 5/2011 | D'Andrea et al. |
| 2011/0130866 A1 | 6/2011 | D'Andrea et al. |
| 2011/0130954 A1 | 6/2011 | D'Andrea et al. |
| 2011/0153063 A1 | 6/2011 | Wurman et al. |
| 2011/0153614 A1* | 6/2011 | Solomon ...................... 707/740 |
| 2011/0157155 A1 | 6/2011 | Turner et al. |
| 2011/0158504 A1 | 6/2011 | Turner et al. |
| 2011/0164030 A1 | 7/2011 | Gay et al. |
| 2011/0200376 A1* | 8/2011 | Oozawa ........................ 400/582 |
| 2011/0200420 A1* | 8/2011 | Driskill et al. ................ 414/807 |
| 2011/0231013 A1 | 9/2011 | Smoot et al. |
| 2011/0248837 A1 | 10/2011 | Israr et al. |
| 2011/0296944 A1 | 12/2011 | Carter et al. |
| 2011/0304633 A1 | 12/2011 | Beardsley et al. |
| 2012/0041677 A1 | 2/2012 | D'Andrea et al. |
| 2012/0079606 A1 | 3/2012 | Evans et al. |
| 2012/0084450 A1 | 4/2012 | Nagamati et al. |
| 2012/0143374 A1 | 6/2012 | Mistry et al. |
| 2012/0143427 A1 | 6/2012 | Hoffman et al. |
| 2012/0173393 A1 | 7/2012 | Acuff et al. |
| 2012/0185218 A1 | 7/2012 | Bickel et al. |
| 2012/0282070 A1 | 11/2012 | D'Andrea et al. |
| 2012/0323746 A1 | 12/2012 | Mountz et al. |
| 2013/0054005 A1 | 2/2013 | Stevens et al. |
| 2013/0054021 A1 | 2/2013 | Murai et al. |
| 2013/0073087 A1 | 3/2013 | Irmler et al. |
| 2013/0079930 A1 | 3/2013 | Mistry |
| 2013/0103185 A1 | 4/2013 | Wurman et al. |
| 2013/0103552 A1 | 4/2013 | Hoffman et al. |
| 2013/0121797 A1 | 5/2013 | Welch et al. |
| 2013/0131865 A1 | 5/2013 | Yamane |
| 2013/0145953 A1 | 6/2013 | Crawford et al. |
| 2013/0173049 A1 | 7/2013 | Brunner et al. |
| 2013/0204429 A1 | 8/2013 | D'Andrea et al. |
| 2013/0204480 A1 | 8/2013 | D'Andrea et al. |
| 2013/0204981 A1 | 8/2013 | Brundage et al. |
| 2013/0211977 A1 | 8/2013 | Lyon et al. |
| 2013/0231933 A1 | 9/2013 | Hajishirzi et al. |
| 2013/0238122 A1 | 9/2013 | Hodgins et al. |
| 2013/0246229 A1 | 9/2013 | Mountz et al. |
| 2013/0251480 A1 | 9/2013 | Watt et al. |
| 2013/0280493 A1 | 10/2013 | Jackson |
| 2013/0302132 A1 | 11/2013 | D'Andrea |
| 2013/0304253 A1 | 11/2013 | Wurman et al. |
| 2013/0321408 A1 | 12/2013 | Turner et al. |
| 2013/0340004 A1 | 12/2013 | Prestenback et al. |
| 2014/0046469 A1 | 2/2014 | Bickel et al. |
| 2014/0100690 A1 | 4/2014 | Wurman et al. |
| 2014/0135977 A1 | 5/2014 | Wurman et al. |
| 2014/0188671 A1 | 7/2014 | Mountz et al. |
| 2014/0195040 A1 | 7/2014 | Wurman et al. |
| 2014/0198948 A1 | 7/2014 | Sigal et al. |
| 2014/0214162 A1 | 7/2014 | Smoot et al. |
| 2014/0228999 A1 | 8/2014 | D'Andrea et al. |
| 2014/0232818 A1 | 8/2014 | Carr et al. |
| 2014/0236413 A1 | 8/2014 | D'Andrea et al. |
| 2014/0249670 A1 | 9/2014 | Yamane |
| 2014/0249693 A1 | 9/2014 | Stark et al. |
| 2014/0250526 A1 | 9/2014 | Khanna et al. |
| 2014/0257553 A1 | 9/2014 | Shakes et al. |
| 2014/0270906 A1 | 9/2014 | Jackson |
| 2014/0292770 A1 | 10/2014 | Beardsley et al. |
| 2014/0294360 A1 | 10/2014 | Raptis et al. |
| 2014/0303773 A1 | 10/2014 | Wurman et al. |
| 2014/0309781 A1 | 10/2014 | Hodgins et al. |
| 2014/0324761 A1 | 10/2014 | Yedidia et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0350831 A1 | 11/2014 | Hoffman et al. |
| 2014/0358263 A1 | 12/2014 | Irmler et al. |
| 2015/0012396 A1 | 1/2015 | Puerini et al. |
| 2015/0019391 A1 | 1/2015 | Kumar et al. |
| 2015/0023490 A1 | 1/2015 | Jay et al. |
| 2015/0032295 A1 | 1/2015 | Stark et al. |
| 2015/0120514 A1* | 4/2015 | Deshpande et al. ............ 705/28 |

FOREIGN PATENT DOCUMENTS

| | | | |
|---|---|---|---|
| CA | 2654258 | A1 | 12/2007 |
| CA | 2654260 | A1 | 12/2007 |
| CA | 2654263 | A1 | 12/2007 |
| CA | 2654336 | A1 | 12/2007 |
| CA | 2654471 | A1 | 12/2007 |
| CA | 2748398 | A1 | 12/2007 |
| CA | 2748407 | A1 | 12/2007 |
| CA | 2750043 | A1 | 12/2007 |
| CA | 2781857 | A1 | 12/2007 |
| CA | 2838044 | A1 | 12/2007 |
| CA | 2866664 | A1 | 12/2007 |
| CA | 2671955 | A1 | 7/2008 |
| CA | 2673025 | A1 | 7/2008 |
| CA | 2674241 | A1 | 7/2008 |
| CA | 2703737 | A1 | 5/2009 |
| CA | 2703740 | A1 | 5/2009 |
| CA | 2754626 | A1 | 9/2010 |
| CA | 2514523 | C | 5/2011 |
| CA | 2778111 | A1 | 5/2011 |
| CA | 2784874 | A1 | 7/2011 |
| CA | 2868578 | A1 | 7/2011 |
| CA | 2654295 | C | 8/2013 |
| CN | 103108815 | A | 5/2013 |
| DE | 10341313 | A1 | 4/2005 |
| EP | 1711241 | A2 | 10/2006 |
| EP | 1799540 | A2 | 6/2007 |
| EP | 1866856 | A1 | 12/2007 |
| EP | 1920396 | A2 | 5/2008 |
| EP | 2036014 | A2 | 3/2009 |
| EP | 2036024 | A2 | 3/2009 |
| EP | 203716 | A2 | 3/2009 |
| EP | 2044495 | A2 | 4/2009 |
| EP | 2047376 | A2 | 4/2009 |
| EP | 2100264 | A2 | 9/2009 |

(56) References Cited

FOREIGN PATENT DOCUMENTS

| | | |
|---|---|---|
| EP | 2102091 A1 | 9/2009 |
| EP | 2115620 A2 | 11/2009 |
| EP | 1590272 B1 | 8/2010 |
| EP | 2220859 A2 | 8/2010 |
| EP | 2233387 A1 | 9/2010 |
| EP | 2306744 A2 | 4/2011 |
| EP | 2306745 A2 | 4/2011 |
| EP | 2339497 A2 | 6/2011 |
| EP | 2044494 B1 | 10/2011 |
| EP | 2411946 A1 | 2/2012 |
| EP | 2239106 B1 | 3/2012 |
| EP | 2471249 A1 | 7/2012 |
| EP | 2493794 A1 | 9/2012 |
| EP | 2499067 A2 | 9/2012 |
| EP | 2197561 B1 | 10/2012 |
| EP | 2407845 B1 | 4/2013 |
| EP | 2596922 A2 | 5/2013 |
| EP | 2619685 A1 | 7/2013 |
| EP | 2653281 A2 | 10/2013 |
| WO | 2004066124 A2 | 8/2004 |
| WO | 2004107616 A2 | 12/2004 |
| WO | 2005069755 A2 | 8/2005 |
| WO | 2005098706 A2 | 10/2005 |
| WO | 2006042347 A2 | 4/2006 |
| WO | 2006044108 A2 | 4/2006 |
| WO | 2006055925 A2 | 5/2006 |
| WO | 2007011814 A2 | 1/2007 |
| WO | 2007145749 A2 | 12/2007 |
| WO | 2007149194 A2 | 12/2007 |
| WO | 2007149196 A2 | 12/2007 |
| WO | 2007149227 A2 | 12/2007 |
| WO | 2007149703 A2 | 12/2007 |
| WO | 2007149711 A2 | 12/2007 |
| WO | 2007149712 A2 | 12/2007 |
| WO | 2008016899 A2 | 2/2008 |
| WO | 2008085628 A2 | 7/2008 |
| WO | 2008085638 A2 | 7/2008 |
| WO | 2008085639 A1 | 7/2008 |
| WO | 2036012 A2 | 3/2009 |
| WO | 2009036199 A2 | 3/2009 |
| WO | 2009064775 A1 | 5/2009 |
| WO | 2009064782 A2 | 5/2009 |
| WO | 2009151797 A2 | 12/2009 |
| WO | 2010110981 A1 | 9/2010 |
| WO | 2011025824 A1 | 3/2011 |
| WO | 2011059596 A1 | 5/2011 |
| WO | 2011087583 A2 | 7/2011 |
| WO | 2012040385 A1 | 3/2012 |
| WO | 2013121113 A1 | 8/2013 |
| WO | 2013126048 A1 | 8/2013 |
| WO | 2013173047 A1 | 11/2013 |
| WO | 2014055716 A1 | 4/2014 |
| WO | 2014077819 A1 | 5/2014 |
| WO | 2014082043 A2 | 5/2014 |
| WO | 2014116947 A1 | 7/2014 |

OTHER PUBLICATIONS

Peter Whitney et al."A Low-Friction Passive Fluid Transmission and Fluid-Tendon Soft Actuator", IEEE/RSJ International Conference on Intelligent Robots and Systems (IROS) 2014, Sep. 14, 2014 (pp. 4) http://www.disneyresearch.com/publication/fluid-soft-actuator/.

\* cited by examiner

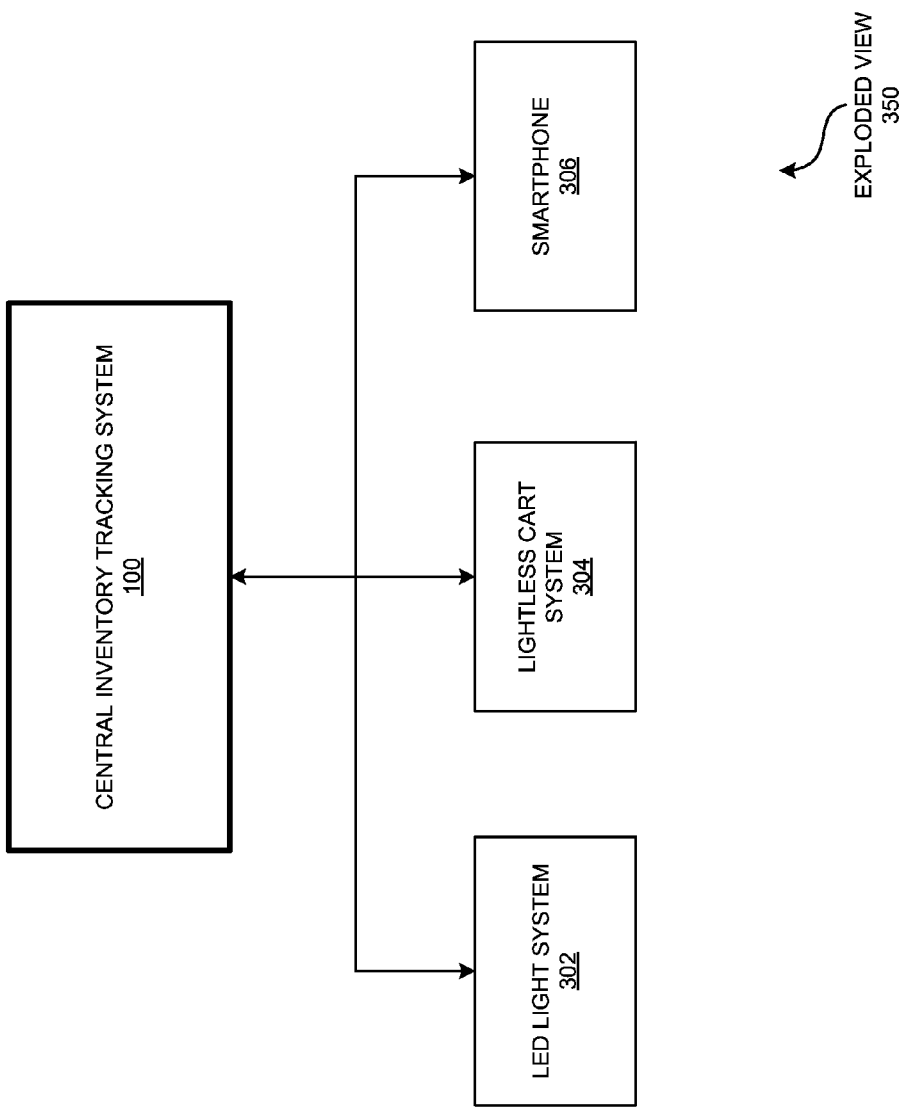

US 9,262,741 B1

CONTINUOUS BARCODE TAPE BASED INVENTORY LOCATION TRACKING

FIELD OF TECHNOLOGY

This disclosure relates generally to the communications field, and more particularly to a method, system, and device of inventory tracking in a distribution center using a barcode tape.

BACKGROUND

A distribution center (e.g., a warehouse, a fulfillment center, a cross-dock facility, a bulk break center, an unstructured storage area, and/or a package handling center) may be a physical space in which inventory (e.g., products) are stored for downstream delivery to retailers or consumers. The distribution center may allow a single location to stock a number of products. Some organizations may operate retail and/or direct-to-consumer distribution in a single facility to share investments (e.g., in space, equipment, labor resources, and/or inventory as applicable).

The distribution center may have a series of rows having stacked shelving. Items may be stored on these shelves. A warehouse management system (e.g., WMS system) may be used to identify and track inventory in the distribution center. However, the warehouse management system may be cost prohibitive to smaller merchants and distributors. Therefore, smaller merchants and distributors may manually keep track of items stored in stacked shelving based on shelf number, row number, column number, and/or relative position. They may manually label shelves, rows, and/or columns, and may need manually maintain inventory location spreadsheets. This may be a time consuming and error prone process. For example, items may be mislabeled and incorrectly categorized because of human error.

As a result, workers in the distribution center seeking to find inventory to fulfill a particular request may spend added time in finding needed items. Workers may need to manually look at a map, discern the labels of each product, and/or search for products on shelves by reading individual labels. This may be time consuming and inefficient. When a new worker is employed, it may take time for them to develop a mental map of the distribution center. This may increase cost. Further, such manual processes may be error prone because they may depend on human labor. Relabeling and/or rerouting of the distribution center to accommodate customized solutions may be difficult to modify, inefficient, expensive, and/or cost prohibitive.

SUMMARY

Disclosed are a method, system and/or device of continuous bar code tape based inventory location tracking.

In one aspect, a method includes analyzing a layout diagram of a distribution center. The method further includes determining that the layout diagram includes a shelf. A number of segments associated with the shelf based on a forecasted allocation of an inventory on the shelf are calculated. A bar code tape having a globally unique identifier (GUID) associated with each segment of the number of shelves is automatically generated using a processor and a memory of a central inventory tracking system.

The number of segments associated with the shelf may be calculated based on a size, a position, an availability, a demand, and/or a supply of an item of the inventory may be placed on the shelf. The bar code tape may be a continuous bar code tape where a reader device to read any GUID along with a length of the shelf of the distribution center. The bar code tape may include a series of discrete bar codes placed adjacent to each other. Each GUID may be unique to each of the number of segments. Each GUID may be 48 bits in length. Each item in each of the series of discrete bar codes may be a distance of that barcode from a left edge of the bar code tape in centimeters encoded by Base-36 into 32 bits. Every barcode of the series of discrete bar codes may have a preamble to make it recognizable to the central inventory tracking system.

The method may determine that the item of inventory is scanned associated with the GUID during a fulfillment process associated with an ecommerce order using the processor and the memory of the central inventory tracking system. A financial account of the distribution center may be automatically debited when the bar code tape is utilized during the fulfillment process associated with the ecommerce order using the central inventory tracking system. A location of the item in the distribution center may be uniquely identified whenever any GUID associated with the bar code tape is scanned. A set of rows associated with the shelf may be determined. Additional bar code tapes and additional GUIDs associated with each segment of the rows for each one of the set of rows associated with the shelf may be automatically generated based on the number of segments determined to be optimal for each row of the set of rows associated with the shelf.

The central inventory tracking system may be combined with a LED lights system, lightless cart system, and/or a smartphone to manage inventory with low complexity in real time operations with a set of items having heterogeneous sizes. The bar code tape may include a series of infrared dots of a fixed size and placed at a varying distance apart from each other to facilitate faster reads of the barcode through a mobile device. The mobile device may be able to more quickly focus and read data of the bar code tape by first identifying the infrared dots on the bar code tape when identifying a location of the item. The method may further include generating a map of where the bar code tape is to be placed on the shelf. The bar code tape may be automatically printed based on a calculation of the number of segments associated with the shelf. The map and the bar code tape to the distribution center may be shipped for placement. The central inventory tracking system may be automatically validate that a particular item is placed in a location consistent with a plan of the distribution center when a particular GUID associated with the particular item is scanned during an inventory replenishment process.

In another aspect, a method includes determining that a layout diagram of a distribution center includes a shelf. A number of segments associated with the shelf are calculated based on a forecasted allocation of an inventory on the shelf. A bar code tape having a globally unique identifier (GUID) associated with each segment of the number of shelves is automatically generated using a processor and a memory of a central inventory tracking system. The method further includes validating that a particular item is placed in a location consistent with a plan of the distribution center when a particular GUID associated with the particular item is scanned during an inventory replenishment process.

In yet another aspect, a method of a central inventory tracking system includes calculating a number of segments associated with a shelf based on a forecasted allocation of an inventory on the shelf. A bar code tape having a globally unique identifier (GUID) associated with each segment of the number of shelves is automatically generated using a processor and a memory of the central inventory tracking system.

The method further includes generating a map of where the bar code tape is to be placed on the shelf. The bar code tape is automatically printed based on the calculation of the number of segments associated with the shelf. The map and the bar code tape to a distribution center are shipped for placement.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3A is an exploded view of the central inventory tracking system of FIG. 1A to manage an inventory, according to one embodiment.

Figure 1A:
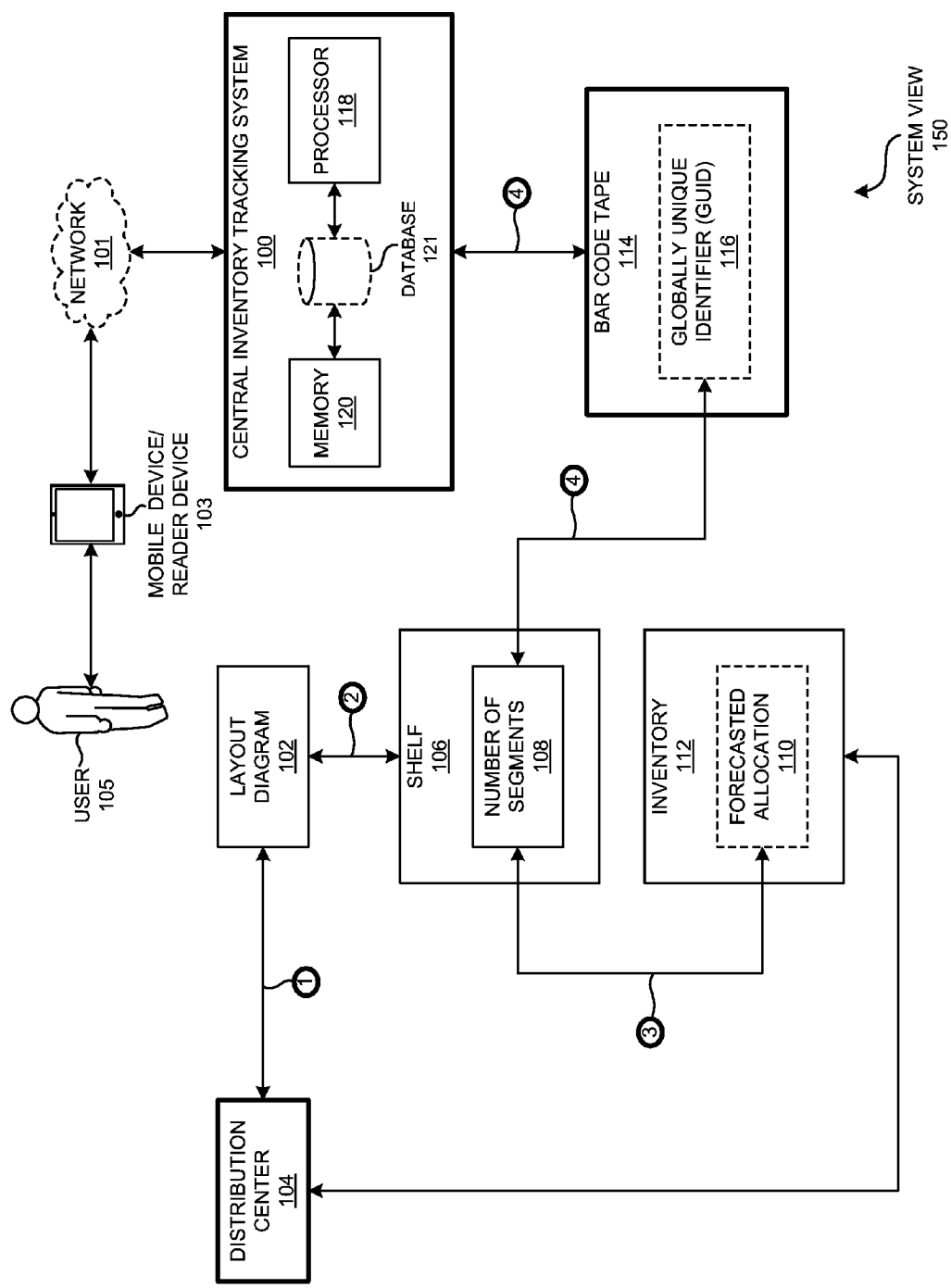
FIG. 1A is a system view of a distribution center generating a bar code tape using a central inventory tracking system, according to one embodiment.

Other features of the present embodiments will be apparent from the accompanying drawings and from the detailed description that follows.

DETAILED DESCRIPTION

Example embodiments, as described below, may be used to provide a method, system and/or device of continuous bar code tape based inventory location tracking. Although, the present embodiments have been described with reference to specific example embodiments, it will be evident that various modifications and changes may be made to these embodiments without departing from the broader spirit and scope of the various embodiments.

In one embodiment, a method includes analyzing a layout diagram 102 of a distribution center 104. The method further includes determining that the layout diagram 102 includes a shelf 106. A number of segments 108 associated with the shelf 106 based on a forecasted allocation 110 of an inventory 112 on the shelf 106 are calculated. A bar code tape 114 having a globally unique identifier (GUID) 116 associated with each segment of the number of shelves is automatically generated using a processor 118 and a memory 120 of a central inventory tracking system 100.

The number of segments 108 associated with the shelf 106 may be calculated based on a size 122, a position 124, an availability 126, a demand 128, and/or a supply 130 of an item of the inventory 112 may be placed on the shelf 106. The bar code tape 114 may be a continuous bar code tape 114 where a mobile device/reader device 103 to read any GUID 116 along with a length of the shelf 106 of the distribution center 104. The bar code tape 114 may include a series of discrete bar codes 202 placed adjacent to each other. Each GUID 116 may be unique to each of the number of segments 108. Each GUID 116 may be 48 bits in length. Each item in each of the series of discrete bar codes 202 may be a distance of that barcode from a left edge of the bar code tape 114 in centimeters encoded by Base-36 into 32 bits. Every barcode of the series of discrete bar codes 202 may have a preamble to make it recognizable to the central inventory tracking system 100.

The method may determine that the item of inventory 112 is scanned associated with the GUID 116 during a fulfillment process associated with an ecommerce order using the processor 118 and the memory 120 of the central inventory tracking system 100. A financial account of the distribution center 104 may be automatically debited when the bar code tape 114 is utilized during the fulfillment process associated with the ecommerce order using the central inventory tracking system 100. A location of the item in the distribution center 104 may be uniquely identified whenever any GUID 116 associated with the bar code tape 114 is scanned. A set of rows associated with the shelf 106 may be determined. Additional bar code tapes 114 and additional GUIDs 116 associated with each segment of the rows for each one of the set of rows associated with the shelf 106 may be automatically generated based on the number of segments 108 determined to be optimal for each row of the set of rows associated with the shelf 106.

The central inventory tracking system 100 may be combined with a LED light system 302, lightless cart system 304, and/or a smartphone 306 to manage inventory 112 with low complexity in real time operations with a set of items having heterogeneous sizes. The bar code tape may include a series of infrared dots 204 of a fixed size and placed at a varying distance apart from each other to facilitate faster reads of the barcode through a mobile device/reader device 103. The mobile device/reader device 103 may be able to more quickly focus and read data of the bar code tape 114 by first identifying the infrared dots on the bar code tape 114 when identifying a location of the item. The method may further include generating a map of where the bar code tape 114 is to be placed on the shelf 106. The bar code tape 114 may be automatically printed based on the calculation of the number of segments 108 associated with the shelf 106. The map and/or the bar code tape 114 to the distribution center 104 may be shipped for placement. The central inventory tracking system 100 may be automatically validate that a particular item 308 is placed in a location consistent with a plan 310 of the distribution center 104 when a particular GUID 312 associated with the particular item 308 is scanned during an inventory replenishment process.

In another embodiment, a method includes determining that a layout diagram 102 of a distribution center 104 includes a shelf 106. A number of segments 108 associated with the shelf 106 are calculated based on a forecasted allocation 110 of an inventory 112 on the shelf 106. A bar code tape 114 having a globally unique identifier (GUID) 116 associated with each segment of the number of shelves is automatically generated using a processor 118 and a memory 120 of a central inventory tracking system 100. The method further includes validating that a particular item 308 is placed in a location consistent with a plan 310 of the distribution center 104 when a particular GUID 312 associated with the particular item 308 is scanned during an inventory replenishment process.

In yet another embodiment, a method of a central inventory tracking system 100 includes calculating a number of segments 108 associated with a shelf 106 based on a forecasted allocation 110 of an inventory 112 on the shelf 106. A bar code tape 114 having a globally unique identifier (GUID) 116 associated with each segment of the number of shelves is automatically generated using a processor 118 and a memory 120 of the central inventory tracking system 100. The method further includes generating a map of where the bar code tape 114 is to be placed on the shelf 106. The bar code tape 114 is automatically printed based on the calculation of the number of segments 108 associated with the shelf 106. The map and the bar code tape 114 to a distribution center 104 are shipped for placement.

FIG. 1A is a system view 150 of a distribution center 104 generating a bar code tape 114 using a central inventory tracking system 100, according to one embodiment.

Particularly, FIG. 1A shows a central inventory tracking system 100, a network 101, a layout diagram 102, a distribution center 104, a shelf 106, a number of segments 108, a forecasted allocation 110, an inventory 112, a bar code tape 114, a globally unique identifier (GUID) 116, a processor 118, a memory 120 and a database 121, according to one embodiment.

A central inventory tracking system 100 may be a computing system specially configured to observe and monitor location and placement of inventory in a distribution center. The central inventory tracking system 100 may read (e.g., read from bar code) any passive and active globally unique identifier (GUID) 116 and analyze read data into Work in Progress models of the distribution center(s) 104. However the central inventory tracking system 100 could also be capable to provide monitoring data without being associated to a single by using a cooperative tracking capability (e.g., may be spread across multiple geographies). A network 101 may be a group of computing devices (e.g., hardware and software) that may be linked together through communication channels (e.g., wired, wireless) to facilitate communication and resource-sharing among a wide range of users, according to one embodiment.

A layout diagram 102 may be a simplified drawing and/or a schematic representation showing a structure and/or an arrangement of the distribution center 104. A mobile device/reader device 103 may be a generic term used to refer to a variety of devices that allow user 105 to access data and information from where ever they are. This may include cell phones and portable devices such as a smartphone 306 of FIG. 3A and/or tablet computer. The mobile device/reader device 103 may be used to read the data of the bar code tape 114 on the shelf 106 in the distribution center 104, according to one embodiment.

In one embodiment, a distribution center 104 may be a building; structure and/or group of units used to store goods and/or merchandise that are to be delivered to various places on an as-needed basis. Large facilities may be sometimes shared by several businesses to reduce each company's overhead. A distribution center 104 may ship goods to one and/or many destinations. A user 105 may be a person who may use and/or operate the mobile device/reader device 103 in the distribution center 104.

A shelf 106 may be a flat horizontal plane which is used in a home, a business, a store, and/or a distribution center 104 to hold items of value that are being displayed, stored, and/or offered for sale. A shelf 106 may be raised off the ground and usually anchored/supported on its shorter length sides by brackets. A shelf may also be held up by columns and/or pillars, according to one embodiment. Number of segments 108 may be the rows one on another associated with the shelf 106 used to hold the inventory 112 in the distribution center 104, according to one embodiment.

A forecasted allocation 110 may be a predicted/estimated action and/or process of allocating and sharing out the inventory 112 on the shelf 106, according to one embodiment. An inventory 112 may be a company's merchandise, raw materials, and/or finished and unfinished products which may have not yet been sold. A bar code tape 114 may consist of a group of printed and/or variously patterned bars and spaces and sometimes numerals that may be designed to be scanned and read into computer memory and that contains information (as identification) about the object it labels. A bar code tape 114 may have a globally unique identifier (GUID) 116, according to one embodiment.

A globally unique identifier (GUID) 116 may be a 128-bit number created by the operating system and/or another application to uniquely identify specific components, hardware, software, files, user accounts, database entries and/or other items. The globally unique identifier (GUID) 116 may be associated with each segment of the number of shelves using the central inventory tracking system 100. A processor 118 may be a central unit of the computer and/or mobile device/reader device 103 containing the logic circuitry to perform all the basic instructions of a computer program, according to one embodiment.

A memory 120 may be a device used to store data or programs (e.g., sequences of instructions) on a temporary and/or permanent basis for use in an electronic digital computer. A database 121 may be a collection of information that is organized so that it can easily be accessed, managed, and/or updated, according to one embodiment.

FIG. 1A illustrates the central inventory tracking system 100 communicatively coupled with the mobile device/reader device 103 of the user 105 through the network 101. The Bar code tape 114 having the globally unique identifier (GUID) 116 is coupled with the central inventory tracking system 100 and the number of segments 108 of the shelf 106. The inventory 112 is stored on the number of segments 108 of the shelf 106 in the distribution center 104, according to one embodiment.

In circle '1', the method analyzes the layout diagram 102 of the distribution center 104. In circle '2', the method determines that the layout diagram 102 includes the shelf 106. In circle '3', the number of segments 108 associated with the shelf 106 are calculated based on the forecasted allocation 110 of the inventory 112 on the shelf 106. In circle '4', the bar code tape 114 having the globally unique identifier (GUID) 116 associated with each segment of the number of shelves is automatically generated using the processor 118 and the memory 120 of the central inventory tracking system 100, according to one embodiment.

Figure 1B:
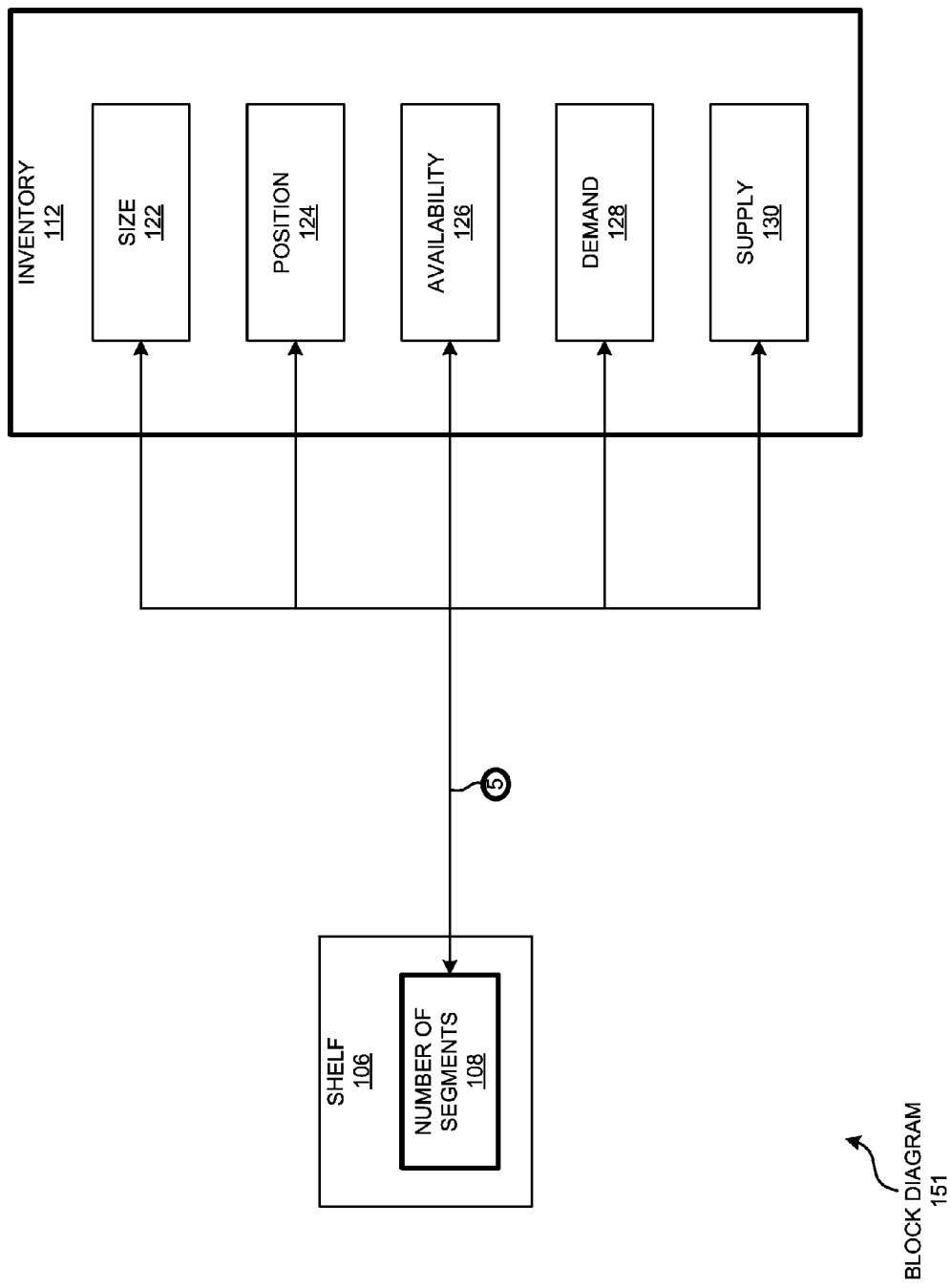
FIG. 1B illustrates a block diagram of inventory to calculate a number of segments associated with a shelf, according to one embodiment.

FIG. 1B illustrates a block diagram 151 of inventory 112 to calculate a number of segments 108 associated with a shelf 106, according to one embodiment.

Particularly, FIG. 1B builds on FIG. 1A, and further adds a size 122, a position 124, availability 126, a demand 128 and a supply 130, according to one embodiment.

A size 122 may be the relative extent of the inventory item; an inventory item's overall dimensions and/or magnitude; how big the inventory item may be. A position 124 may be a particular way in which an item of the inventory 112 is placed and/or arranged on the shelf 106 in the distribution center 104, according to one embodiment. Availability 126 may be a quantity of products currently located in inventory. The products in the inventory 112 of FIG. 1A may be ready to use for the customers, according to one embodiment.

In one embodiment, a demand 128 may be an amount of the inventory 112 that a consumer and/or a group of consumers may want to purchase at a given price, according to one embodiment. A supply 130 may be a fundamental economic concept that may describe the total amount of the inventory 112 of FIG. 1A that may be available to consumers.

FIG. 1B illustrates the item of the inventory 112 including the size 122, the position 124, the availability 126, the demand 128 and the supply 130. The number of segments 108 is associated with the item of the inventory 112 of FIG. 1A, according to one embodiment.

In circle '5', the number of segments 108 associated with the shelf 106 is calculated based on the size 122, the position 124, the availability 126, the demand 128, and the supply 130 of the item of the inventory 112 to be placed on the shelf 106 of FIG. 1A, according to one embodiment.

Figure 2:
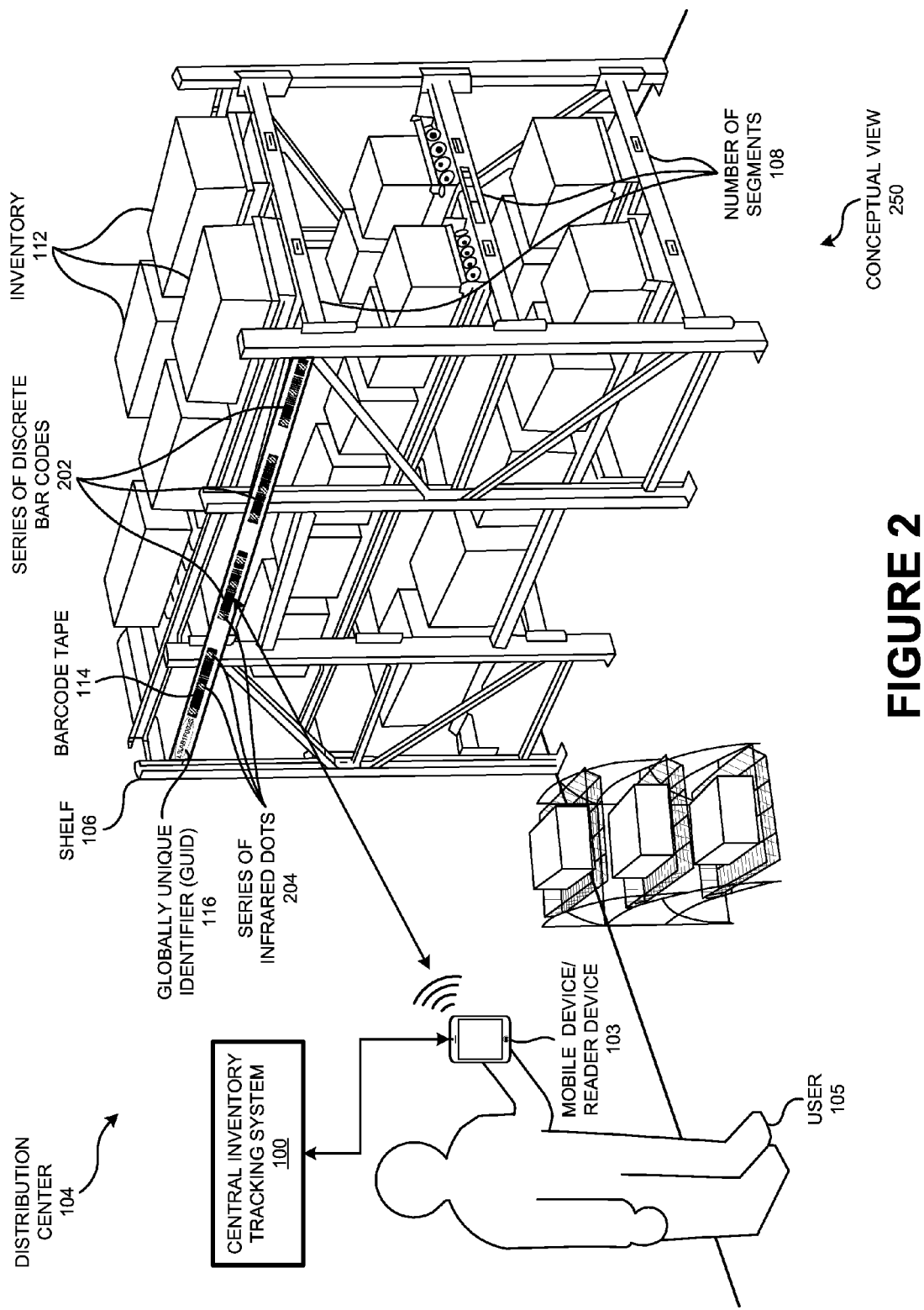
FIG. 2 is a conceptual view of the central inventory tracking system of FIG. 1A, according to one embodiment.

FIG. 2 is a conceptual view 250 of the central inventory tracking system 100 of FIG. 1A, according to one embodiment.

Particularly, FIG. 2 builds on FIG. 1A, and further adds a series of discrete bar codes 202 and a series of infrared dots 204, according to one embodiment.

In one embodiment, a series of discrete bar codes 202 may consist of individually separate and distinct group of printed and/or variously patterned bars and spaces and sometimes numerals that may be designed to be scanned and read into computer memory and that may contain information (as identification) about the object it labels. A series of infrared dots 204 (of electromagnetic radiation) may be the sequence of particles of a fixed size having a wavelength just greater than that of the red end of the visible light spectrum but less than that of microwaves.

FIG. 2 illustrates the central inventory tracking system 100 communicatively coupled with the mobile device/reader device 103 of the user 105 through the network 101. The Bar code tape 114 having the globally unique identifier (GUID) 116 is coupled with the central inventory tracking system 100 and the number of segments 108 of the shelf 106. The inventory 112 is stored on the number of segments 108 of the shelf 106 in the distribution center 104. The bar code tape 114 having the globally unique identifier (GUID) 116 associated with each segment of the number of shelves is automatically generated using the processor 118 and the memory 120 of the central inventory tracking system 100 of FIG. 1A, according to one embodiment.

In one embodiment, the bar code tape 114 is a continuous bar code tape 114 where the mobile device/reader device 103 to read any globally unique identifier (GUID) 116 along with a length of the shelf 106 of the distribution center 104 of FIG. 1A. The bar code tape 114 includes a series of discrete bar codes 202 placed adjacent to each other.

The bar code tape 114 includes a series of infrared dots 204 of a fixed size and placed at a varying distance apart from each other to facilitate faster reads of the barcode through a mobile device/reader device 103. The mobile device/reader device 103 is able to more quickly focus and read data of the bar code tape 114 by first identifying the infrared dots on the bar code tape 114 when identifying a location of the item on the shelf 106 in the distribution center 104 of FIG. 1A, according to one embodiment.

FIG. 3A is an exploded view 350 of the central inventory tracking system 100 of FIG. 1A to manage the inventory 112, according to one embodiment.

Particularly, FIG. 3A builds on FIG. 1A, and further adds a LED light system 302, a lightless cart system 304 and a smartphone 306, according to one embodiment.

A LED light system 302 may be a method of a light-emitting diode (LED), which may be a two-lead semiconductor light source. As with other light source technologies, such as fluorescent and high intensity discharge, lighting systems using LEDs can be thought of as having a light source, ballast, and a luminaire. A lightless cart system 304 may be a technique of a strong open vehicle with four wheels having no light, typically used for carrying the inventory 112 in the distribution center 104 of FIG. 1A, according to one embodiment.

A smartphone 306 may be a mobile device/reader device 103 that may perform many of the functions of a computer, typically having a touchscreen interface, internet access, and/or an operating system capable of running downloaded applications. A smartphone 306 may be used to manage inventory 112 of FIG. 1A, according to one embodiment.

FIG. 3A illustrates the central inventory tracking system 100 is communicatively coupled with the LED light system 302, the lightless cart system 304 and the smartphone 306. The central inventory tracking system 100 is combined with the LED light system 302, the lightless cart system 304, and the smartphone 306 to manage inventory 112 of FIG. 1A with low complexity in real time operations with a set of items having heterogeneous sizes, according to one embodiment.

Figure 3B:
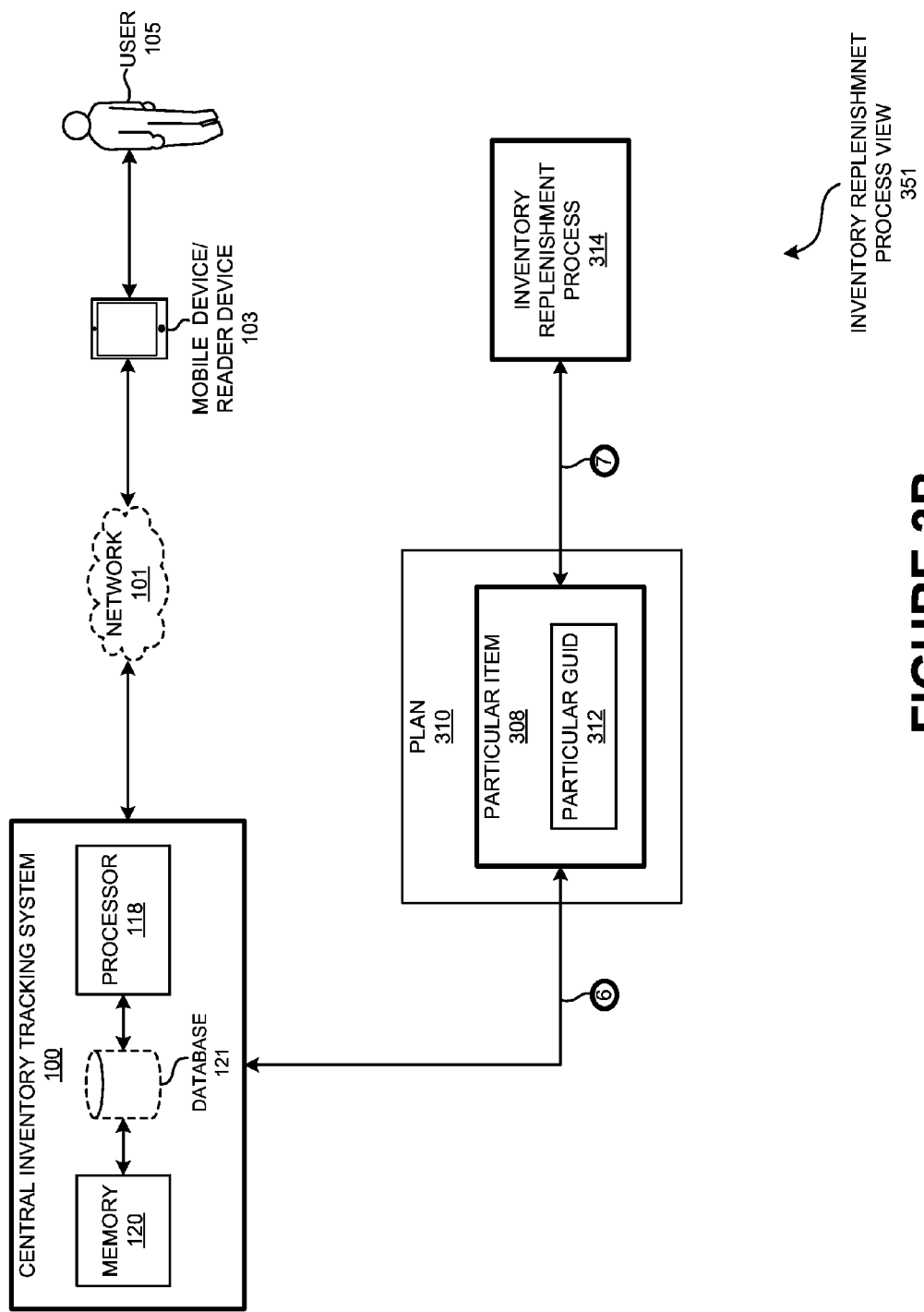
FIG. 3B is an inventory replenishment process view to validate and scan a particular item using the central inventory tracking system of FIG. 1A, according to one embodiment.

FIG. 3B is an inventory replenishment process view 351 to validate and scan a particular item 308 using the central inventory tracking system 100 of FIG. 1A, according to one embodiment.

Particularly, FIG. 3B builds on FIG. 1A, and further adds a particular item 308, a plan 310, a particular GUID 312 and an inventory replenishment process 314, according to one embodiment.

A particular item 308 may be an individual product in the inventory 112 which may be a company's merchandise, raw materials, and/or finished and unfinished products which may have not yet been sold. A plan 310 of distribution center 104 may be a design and/or a blueprint produced to show the look, function and/or workings of the distribution center 104 of FIG. 1A, according to one embodiment.

In one embodiment, a particular GUID 312 may be an individual globally unique identifier (GUID) 116 which may be a 128-bit number created by the Windows operating system and/or another Windows application to uniquely identify specific components, hardware, software, files, user accounts, database entries and/or other items. Particular GUID 312 may be associated with the particular item 308. An inventory replenishment process 314 may be a method of movement of the inventory 112 of FIG. 1A from upstream and/or reserve product storage locations to downstream and primary storage, picking and shipment locations.

Particularly, FIG. 3B illustrates the central inventory tracking system 100 communicatively coupled with the mobile device/reader device 103 of the user 105 through the network. The central inventory tracking system is associated with the particular item 308 containing the particular GUID 312 of the plan 310 of the distribution center 104. The particular item 308 is coupled with the inventory replenishment process 314, according to one embodiment.

In one embodiment, the central inventory tracking system 100 is automatically validated that the particular item 308 is placed in a location consistent with a plan 310 of the distribution center 104 of FIG. 1A when a particular GUID 312 associated with the particular item 308 is scanned during an inventory replenishment process 314.

Figure 4:
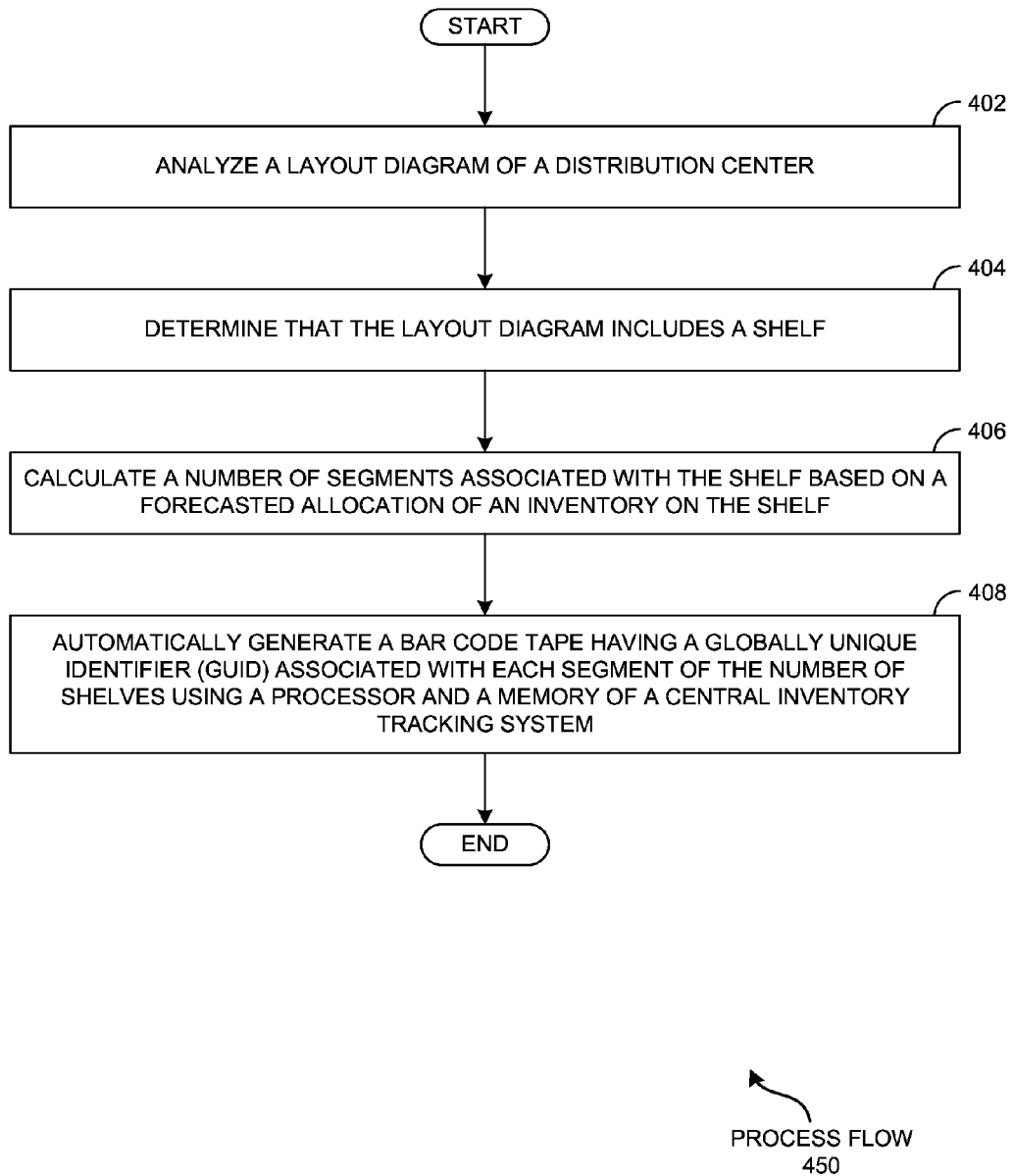
FIG. 4 is a process flow generating a bar code tape using the central inventory tracking system of FIG. 1A, according to one embodiment.

FIG. 4 is a process flow 450 generating a bar code tape 114 using the central inventory tracking system 100 of FIG. 1A, according to one embodiment.

In operation 402, a method may analyze a layout diagram 102 of a distribution center 104. In operation 404, the method may determine that the layout diagram 102 includes a shelf 106. In operation 406, a number of segments 108 may be calculated associated with the shelf 106 based on a forecasted allocation 110 of an inventory 112 on the shelf 106, according to one embodiment.

In operation 408, a bar code tape 114 having a globally unique identifier (GUID) 116 associated with each segment of the number of shelves may be automatically generated using the processor 118 and the memory 120 of a central inventory tracking system 100 of FIG. 1A, according to one embodiment.

Figure 5:
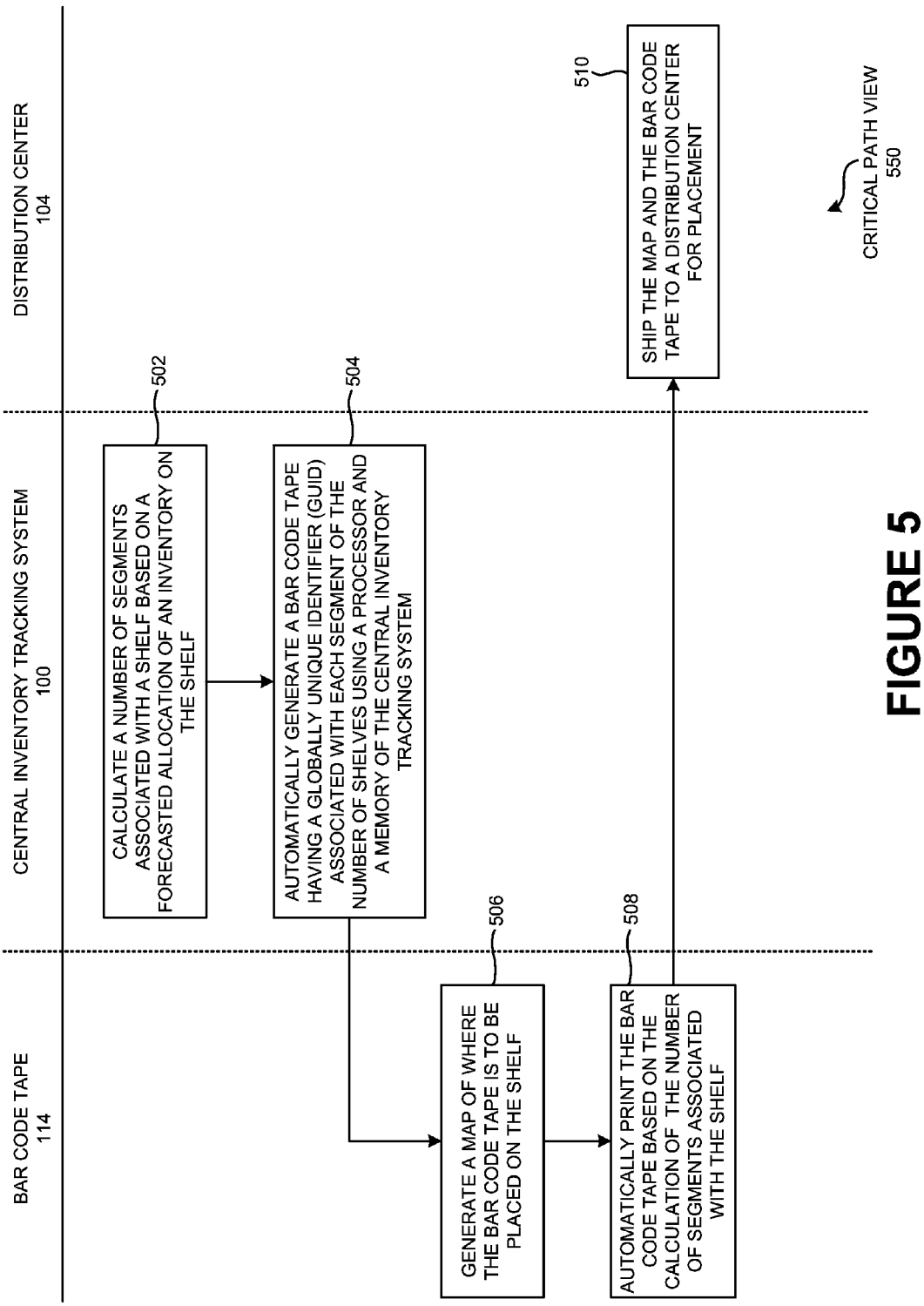
FIG. 5 is a critical path view illustrating shipping the map and the bar code tape to a distribution center, according to one embodiment.

FIG. 5 is a critical path view 550 illustrating shipping the map and the bar code tape 114 to a distribution center 104 of FIG. 1A, according to one embodiment.

In operation 502, a number of segments 108 associated with a shelf 106 may be calculated based on a forecasted allocation 110 of an inventory 112 on the shelf 106. In operation 504, a bar code tape 114 having a globally unique identifier (GUID) 116 associated with each segment of the number of shelves may be automatically generated using the processor 118 and the memory 120 of the central inventory tracking system 100 of FIG. 1A, according to one embodiment.

In operation 506, the method may generate a map of where the bar code tape 114 is to be placed on the shelf 106. In operation 508, the bar code tape 114 may be automatically printed based on the calculation of the number of segments 108 associated with the shelf 106. In operation 510, the map and the bar code tape 114 may be shipped to a distribution center 104 of FIG. 1A for placement, according to one embodiment.

Figure 6:
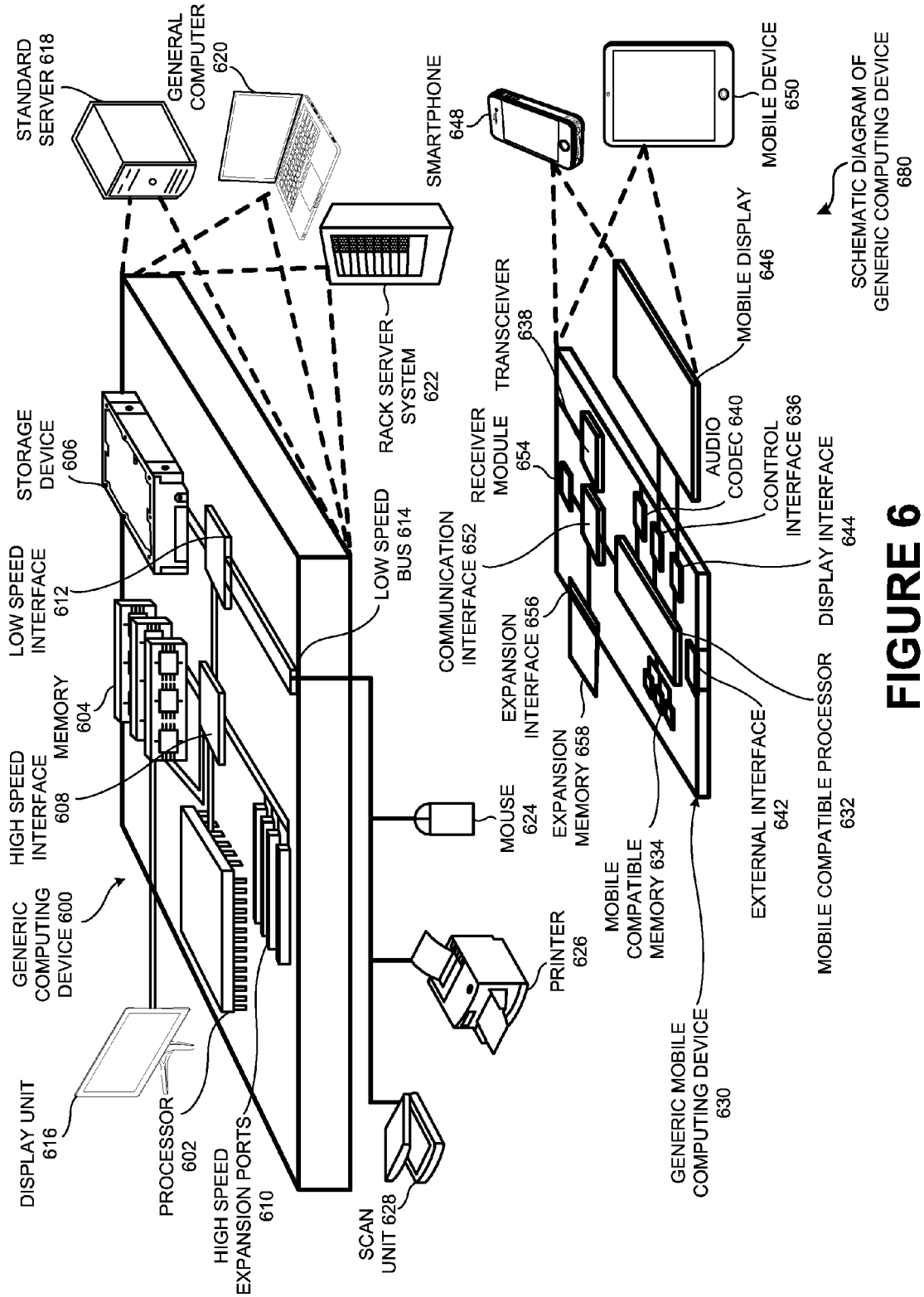
FIG. 6 is a schematic diagram of a representative computing device that can be used to implement the methods and systems, according to one embodiment.

FIG. 6 is a schematic diagram 680 of representative computing devices 600 that can be used to implement the methods and systems disclosed herein, according to one embodiment.

FIG. 6 is a schematic diagram 680 of the representative computing devices 600 and a mobile device 630 that can be used to perform and/or implement any of the embodiments disclosed herein. In one or more embodiments, central inventory tracking system 100 and/or mobile device/reader device 103 of FIG. 1A may be the representative computing devices 600.

The representative computing devices 600 may represent various forms of digital computers, such as laptops, desktops, workstations, personal digital assistants, servers, blade servers, mainframes, and/or other appropriate computers. The mobile device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The representative computing devices 600 may include a processor 602, a memory 604, a storage device 606, a high speed interface 608 coupled to the memory 604 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate.

The processor 602 may process instructions for execution in the representative computing devices 600, including instructions stored in the memory 604 and/or on the storage device 606 to display a graphical information for a GUI on an external input/output device, such as a display unit 616 coupled to the high speed interface 608. In other embodiments, multiple processor(s) 602 and/or multiple buses may be used, as appropriate, along with multiple memories and/or types of memory 604. Also, a plurality of representative computing devices 600 may be coupled with, with each device providing portions of the necessary operations (e.g., as a server bank, a group of blade servers, and/or a multi-processor system).

The memory 604 may be coupled to the representative computing devices 600. In one embodiment, the memory 604 may be a volatile memory. In another embodiment, the memory 604 may be a non-volatile memory. The memory 604 may also be another form of computer-readable medium, such as a magnetic and/or an optical disk. The storage device 606 may be capable of providing mass storage for the representative computing devices 600.

In one embodiment, the storage device 606 may be included of a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be included of instructions that, when executed, perform one or more methods, such as those described above. The instructions may be stored in the memory 604, the storage device 606, a memory 604 coupled to the processor 602, and/or a propagated signal.

The high speed interface 608 may manage bandwidth-intensive operations for the representative computing devices 600, while the low speed interface 612 may manage lower bandwidth-intensive operations. Such allocation of functions is exemplary only. In one embodiment, the high speed interface 608 may be coupled to the memory 604, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be included of a wired and/or wireless communication port (e.g., a Universal Serial Bus ("USB"), a Bluetooth® port, an Ethernet port, and/or a wireless Ethernet port). The low speed bus 614 may also be coupled to scan unit 628, a printer 626, a keyboard, a mouse 624, and a networking device (e.g., a switch and/or a router) through a network adapter.

The representative computing devices 600 may be implemented in a number of different forms, as shown in the Figure. In one embodiment, the representative computing devices 600 may be implemented as a standard server 618 and/or a group of such servers. In another embodiment, the representative computing devices 600 may be implemented as part of a rack server system 622. In yet another embodiment, the representative computing devices 600 may be implemented as a general computer 620 such as a laptop and/or desktop computer. Alternatively, a component from the representative computing devices 600 may be combined with another component in a mobile device 630.

In one or more embodiments, an entire system may be made up of a plurality of representative computing devices 600 and/or a plurality of representative computing devices 600 coupled to a plurality of mobile device 630.

In one embodiment, the mobile device 630 may include a mobile compatible processor 632, a mobile compatible memory 634, and an input/output device such as a mobile display 646, a communication interface 652, and a transceiver 638, among other components. The mobile device 630 may also be provided with a storage device, such as a Microdrive and/or other device, to provide additional storage. In one embodiment, the components indicated heretofore are intercoupled using various buses, and several of the components may be mounted on a common motherboard.

The mobile compatible processor 632 may execute instructions in the mobile device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the mobile device 630, such as control of user interfaces, applications run by the mobile device 630, and wireless communication by the mobile device 630.

The mobile compatible processor 632 may communicate with a user 105 through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may include appropriate circuitry for driving the mobile display 646 to present graphical and other information to a user 105.

The control interface 636 may receive commands from a user 105 and convert them for submission to the mobile compatible processor 632. In addition, an external interface 642 may be provided in communication with the mobile compatible processor 632, so as to enable near area communication of the mobile device 630 with other devices. External interface 642 may provide, for example, for wired communication in some embodiments, and/or for wireless communication in other embodiments, and multiple interfaces may also be used.

The mobile compatible memory 634 may be coupled to the mobile device 630. The mobile compatible memory 634 may be implemented as a volatile memory and a non-volatile memory. The expansion memory 658 may also be coupled to the mobile device 630 through the expansion interface 656, which may include, for example, a Single In Line Memory Module ("SIMM") card interface. The expansion memory 658 may provide extra storage space for the mobile device 630, and/or may also store an application and/or other information for the mobile device 630.

Specifically, the expansion memory 658 may include instructions to carry out the processes described above. The expansion memory 658 may also include secure information. For example, the expansion memory 658 may be provided as a security module for the mobile device 630, and may be programmed with instructions that permit secure use of the mobile device 630. In addition, a secure application may be provided on the SIMM card, along with additional information, such as placing identifying information on the SIMM card in a non-hackable manner.

The mobile compatible memory 634 may include a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The mobile device 630 may communicate wirelessly through the communication interface 652, which may be included of a digital signal processing circuitry. The communication interface 652 may provide for communications using various modes and/or protocols, such as: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 630, which may be used as appropriate by a software application running on the mobile device 630.

The mobile device 630 may also communicate audibly using an audio codec 640, which may receive spoken information from a user 105 and convert it to usable digital information. The audio codec 640 may likewise generate audible sound for a user 105, such as through a speaker (e.g., in a handset of the mobile device 630). Such a sound may include a sound from a voice telephone call, a recorded sound (e.g., a voice message, a music files, etc.) and may also include a sound generated by an application operating on the mobile device 630.

The mobile device 630 may be implemented in a number of different forms, as shown in the Figure. In one embodiment, the mobile device 630 may be implemented as a smartphone 648. In another embodiment, the mobile device 630 may be implemented as a personal digital assistant ("PDA"). In yet another embodiment, the mobile device, 630 may be implemented as a tablet device.

An example embodiment will now be described. Inventory management may not be an easy task. It may be hard to keep a track of where any particular item is at any given time. Manufacturers, retailers, and/or distributors may use the various embodiments of FIGS. 1-6 to better manage their inventories, proving a relatively simple, cost-effective system, providing up-to-the-minute information on inventory status.

For an example embodiment, when integrated into an existing information system, the various embodiments of FIGS. 1-6 may allow you to track your merchandise and may conduct both full-scale inventories department-wide cycle counts. Inventory may be reconciled in a day instead of weeks. And the various embodiments of FIGS. 1-6 may provide more accurate data while saving both time and costs.

For another example embodiment, manufacturers and/or distributors may use the various embodiments of FIGS. 1-6 to track production, parts, shipping, and/or warehousing. A variety of labels and scanning systems (central inventory tracking system) may be available to accommodate both warehouse and manufacturing environments. Many national chains may require manufacturers to ship their products already tagged and the various embodiments of FIGS. 1-6 to their specifications.

Another example embodiment will now be described, in accordance with at least one embodiment. Retailers may utilize the various embodiments of FIGS. 1-6 for the inventory control, which is crucial to the success of their businesses.

Inventory cycle counts, point-of-sale checkout, purchasing, and/or sales analysis may be just a few of the benefits of the various embodiments of FIGS. 1-6. Retail, package delivery, warehousing and distribution, manufacturing, health care, and/or point-of-service applications can all benefit from the use of the various embodiments of FIGS. 1-6.

The various embodiments of FIGS. 1-6 may read with a scanner (the mobile device/reader device), which measures reflected light and interprets the code into numbers and/or letters that are passed on to a computer (central inventory tracking system).

For an example embodiment, the various embodiments of FIGS. 1-6, automatic identification and GUID may encompass the automatic recognition, decoding, processing, transmission and/or recording of data, commonly through the printing and reading of information encoded in the various embodiments of FIGS. 1-6. The various embodiments of FIGS. 1-6 may allow for rapid, simple and/or accurate reading and transmission of data for items that need to be tracked and/or managed.

With the various embodiments of FIGS. 1-6 data collection solution, capturing data may be faster and more accurate, costs may be lower, mistakes may be minimized, and managing inventory may be much easier.

With the various embodiments of FIGS. 1-6 applied to each item in inventory, portable scanners (mobile devices/reader devices) may be used to track shipping and receiving and quickly take physical inventory. The data from portable scanners (mobile devices/reader devices) may be uploaded to a central inventory tracking system at regular intervals and portables may update inventory in real-time.

The various embodiments of FIGS. 1-6 in inventory control may provide accurate, real-time inventory updates. This may allow a company the opportunity to reduce stock levels and thereby reduce carrying costs. It may also reduce the time taken to collect data for purposes such as annual inventories. With improved efficiency, operating costs may be lower using the various embodiments of FIGS. 1-6 as described herein.

Because the various embodiments of FIGS. 1-6 make it possible to track inventory so precisely, inventory levels can be reduced. This may translate into a lower overheard. The location of inventory item may also be tracked, reducing the time spent searching for it, and the money spent, replacing inventory item that is presumed lost. The various embodiments of FIGS. 1-6 may eliminate manual data entry and mistakes for parts checkout, return, receipt, and/or reorder.

Another example embodiment will now be described, in accordance with at least one embodiment. A distribution center Rivian Automotive in Florida may be a physical space in which inventory (e.g., cars and their spare parts) is stored for downstream delivery to automobile industries in the Rivian Automotive network. The distribution center may allow a single location to stock a number of cars and their spare parts.

The Florida based distribution center of Rivian Automotive may have a series of rows having stacked shelving. In addition, cars and their spare parts may be stored on these shelves. Thanks to the various embodiments of the FIGS. 1-6, the Florida based distribution center may employ the methods described herein of the barcode tape 114 to identify and track inventory in the distribution center. The central inventory tracking system described in the various embodiments of FIGS. 1-6 may be affordable to smaller car merchants and car distributors like Rivian Automotive's Florida based distribution center. Therefore, car merchants and/or car distributors like Rivian Automotive may not need to manually keep track of spare parts of car stored in stacked shelving based on shelf number, row number, column number, and/or relative position thanks to their adoption of the various technologies described in FIGS. 1-6. Further, employees of Rivian Automotive may not need to manually label shelves, rows, and/or columns, and may not need to manually maintain inventory location spreadsheets thanks to deploying the various technologies described in FIGS. 1-6. Employing the various technologies of FIGS. 1-6 may reduce time and create efficiency for Rivian Automotive. Therefore, Rivian Automotive may operate more profitably and successfully, and thrive in the face of stiff competition.

Thanks to the various embodiments of the FIGS. 1-6, workers in the distribution center seeking to find spare parts to fulfill a particular request may spend less time in finding needed spare parts. Workers may not need to manually look at a map, discern the labels of each product, and/or search for products on shelves by reading individual labels. Utilizing the various embodiments described in FIGS. 1-6 may take less time, and increase productivity. When a new worker Amy is employed, he may be quickly productive thanks to the embodiments of FIGS. 1-6. This may reduce cost and increase productivity of Rivian to the investors. Further, such automated processes may be less error prone because they may not depend on human labor thanks to the embodiments of FIGS. 1-6. Relabeling and/or rerouting of the distribution center to accommodate customized solutions may not be essential thanks to the continuous bar code tape and the central tracking system for ease of scanning of the various embodiments described in FIGS. 1-6.

Various embodiments of the methods and system described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, an input device, and/or an output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kind of devices can be used to provide for interaction with a user as well. For example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and/or a wide area network ("WAN") (e.g., the Internet). The computing system can include a client and/or a server. In one embodiment, the client and/or the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, device and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
    analyzing a layout diagram of a distribution center;
    determining that the layout diagram includes a shelf;
    calculating a number of segments associated with the shelf based on a forecasted allocation of an inventory on the shelf; and
    automatically generating a bar code tape having a globally unique identifier (GUID) associated with each segment of the number of shelves using a processor and a memory of a central inventory tracking system,
    wherein the bar code tape is a continuous bar code tape where a reader device to read any GUID along with a length of the shelf of the distribution center,
    wherein the bar code tape is comprised of a series of discrete bar codes placed adjacent to each other,
    wherein the bar code tape includes a series of infrared dots of a fixed size and placed at a varying distance apart from each other to facilitate faster reads of a barcode through a mobile device, and
    wherein the mobile device is able to more quickly focus and read data of the bar code tape by first identifying the infrared dots of the bar code tape when identifying a location of an item of the inventory.

2. The method of claim 1 further comprising:
    calculating the number of segments associated with the shelf based on at least one of a size, a position, an availability, a demand, and a supply of the item to be placed on the shelf.

3. The method of claim 2:
    wherein each GUID is unique to each of the number of segments,
    wherein each GUID is 48 bits in the length, and
    wherein every barcode of the series of discrete bar codes has a preamble to make it recognizable to the central inventory tracking system.

4. The method of claim 3 further comprising:
    determining that the item of the inventory is scanned associated with the GUID during a fulfillment process associated with an ecommerce order using the processor and the memory of the central inventory tracking system; and
    automatically debiting a financial account of the distribution center when the bar code tape is utilized during the fulfillment process associated with the ecommerce order using the central inventory tracking system.

5. The method of claim 4 further comprising uniquely identifying the location of the item in the distribution center whenever any GUID associated with the bar code tape is scanned.

6. The method of claim 1 further comprising:
    determining a set of rows associated with the shelf; and
    automatically generating additional bar code tapes and additional GUIDs associated with each segment of the rows for each one of the set of rows associated with the shelf based on the number of segments determined to be optimal for each row of the set of rows associated with the shelf.

7. The method of claim 1:
    wherein the central inventory tracking system is combined with at least one of a LED lights system, a lightless cart system, and a smartphone to manage the inventory with low complexity in real time operations with a set of items having heterogeneous sizes.

8. The method of claim 1 further comprising:
    generating a map of where the bar code tape is to be placed on the shelf;
    automatically printing the bar code tape based on a calculation of the number of segments associated with the shelf; and
    shipping the map and the bar code tape to the distribution center for placement.

9. The method of claim 1:
    wherein the central inventory tracking system to automatically validate that a particular item is placed in the location consistent with a plan of the distribution center when a particular GUID associated with the particular item is scanned during an inventory replenishment process.

10. A method comprising:
    determining that a layout diagram of a distribution center includes a shelf;
    calculating a number of segments associated with the shelf based on a forecasted allocation of an inventory on the shelf;
    automatically generating a bar code tape having a globally unique identifier (GUID) associated with each segment of the number of shelves using a processor and a memory of a central inventory tracking system; and
    validating that a particular item is placed in a location consistent with a plan of the distribution center when a particular GUID associated with the particular item is scanned during an inventory replenishment process, wherein the bar code tape is a continuous bar code tape where a reader device to read any GUID along with a length of the shelf of the distribution center, wherein the bar code tape is comprised of a series of discrete bar codes placed adjacent to each other, wherein the bar code tape includes a series of infrared dots of a fixed size and placed at a varying distance apart from each other to facilitate faster reads of a bar code through a mobile device, and wherein the mobile device is able to more quickly focus and read data of the bar code tape by first identifying the infrared dots of the bar code tape when identifying the location of an item of the inventory.

11. The method of claim 10 further comprising:

calculating the number of segments associated with the shelf based on at least one of a size, a position, an availability, a demand, and a supply of the item of the inventory to be placed on the shelf.

12. The method of claim 11:

wherein each GUID is unique to each of the number of segments, wherein each GUID is 48 bits in the length, and wherein every barcode of the series of discrete bar codes has a preamble to make it recognizable to the central inventory tracking system.

13. The method of claim 12 further comprising:

determining that the item of the inventory is scanned associated with the GUID during a fulfillment process associated with an ecommerce order using the processor and the memory of the central inventory tracking system; and automatically debiting a financial account of the distribution center when the bar code tape is utilized during the fulfillment process associated with the ecommerce order using the central inventory tracking system.

14. A method of a central inventory tracking system comprising:

calculating a number of segments associated with a shelf based on a forecasted allocation of an inventory on the shelf;

automatically generating a bar code tape having a globally unique identifier (GUID) associated with each segment of a number of shelves using a processor and a memory of the central inventory tracking system;

generating a map of where the bar code tape is to be placed on the shelf;

automatically printing the bar code tape based on a calculation of the number of segments associated with the shelf; and shipping the map and the bar code tape to a distribution center for placement, wherein the bar code tape is a continuous bar code tape where a reader device to read any GUID along with a length of the shelf of the distribution center, wherein the bar code tape is comprised of a series of discrete bar codes placed adjacent to each other, wherein the bar code tape includes a series of infrared dots of a fixed size and placed at a varying distance apart from each other to facilitate faster reads of a bar code through a mobile device, and wherein the mobile device is able to more quickly focus and read data of the bar code tape by first identifying the infrared dots of the bar code tape when identifying the location of an item of the inventory.

15. The method of claim 14 further comprising:

calculating the number of segments associated with the shelf based on at least one of a size, a position, an availability, a demand, and a supply of the item of the inventory to be placed on the shelf.

16. The method of claim 15:

wherein each GUID is unique to each of the number of segments, wherein each GUID is 48 bits in the length, and wherein every barcode of the series of discrete bar codes has a preamble to make it recognizable to the central inventory tracking system.

17. The method of claim 16 further comprising:

determining that the item of the inventory is scanned associated with the GUID during a fulfillment process associated with an ecommerce order using the processor and the memory of the central inventory tracking system; and automatically debiting a financial account of the distribution center when the bar code tape is utilized during the fulfillment process associated with the ecommerce order using the central inventory tracking system.

* * * * *